(12) United States Patent
Huang et al.

(10) Patent No.: US 9,513,734 B2
(45) Date of Patent: Dec. 6, 2016

(54) TOUCH DISPLAY DEVICE

(71) Applicant: Ye Xin Technology Consulting Co., Ltd., Hsinchu (TW)

(72) Inventors: Hung-Yun Huang, Hsinchu (TW); Chia-Lin Liu, Hsinchu (TW); Wei-Cheng Chen, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 53 days.

(21) Appl. No.: 14/514,590

(22) Filed: Oct. 15, 2014

(65) Prior Publication Data

US 2015/0103274 A1  Apr. 16, 2015

(30) Foreign Application Priority Data

Oct. 15, 2013  (TW) .............................. 102137121 A

(51) Int. Cl.
*G06F 3/041* (2006.01)

(52) U.S. Cl.
CPC ........... *G06F 3/0412* (2013.01); *G06F 3/0416* (2013.01); *G06F 2203/04107* (2013.01)

(58) Field of Classification Search
CPC ............... G02F 2001/133334; G02F 1/13452; G02F 3/044
See application file for complete search history.

(56) References Cited

U.S. PATENT DOCUMENTS

| 6,862,066 | B2* | 3/2005 | Oowaki et al. ................ 349/139 |
| 9,217,888 | B2* | 12/2015 | Shimizu et al. | |
| 2007/0045516 | A1* | 3/2007 | Hong .......................... 250/208.1 |
| 2008/0049004 | A1* | 2/2008 | Kunimori et al. ............ 345/207 |
| 2009/0085891 | A1* | 4/2009 | Yang et al. .................... 345/174 |
| 2011/0187677 | A1* | 8/2011 | Hotelling et al. ............ 345/174 |

* cited by examiner

*Primary Examiner* — Nathanael R Briggs
*Assistant Examiner* — Alexander Gross
(74) *Attorney, Agent, or Firm* — Zhigang Ma

(57) ABSTRACT

A touch display device includes a first substrate, a second substrate, a number of first sensing electrodes formed on the first substrate, a number of second sensing electrodes formed on the second substrate, a touch integrated circuit set on the first substrate, and a number of connecting wires formed on the first substrate. The touch integrated circuit includes a number of first pins correspondingly connected to the first sensing electrodes and a number of second pins correspondingly connected to the second sensing electrodes. The connecting wires correspondingly connect two opposite terminals of the first sensing electrodes with two opposite ends of the first pins. A part of connecting wires are arranged between the first pins and the second pins. The first substrate includes a shielding sheet formed in the first substrate and located above the part of the connecting wires arranged between the first pins and the second pins.

16 Claims, 6 Drawing Sheets

TOUCH DISPLAY DEVICE

FIELD

The disclosure generally relates to touch and display technologies.

BACKGROUND

An in-cell touch display device usually includes a opposite substrate, an array substrate opposite to the opposite substrate, a number of first touch sensing electrodes formed on the opposite substrate, and a number of second touch sensing electrodes formed on the array substrate. The first touch sensing electrodes are connected to a number of first pins of a touch integrated circuit (IC) on the array substrate via a flexible printed circuit (FPC). The second touch sensing electrodes are connected to a number of second pins of the touch IC via a number of wires. However, a coupling capacitance is generated between the wires of the second touch sensing electrodes and the first pins of the first touch sensing electrodes, which adversely affects touch signal sensed by the first touch sensing electrodes and the second touch sensing electrodes and reduces accuracy of touch sensing.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
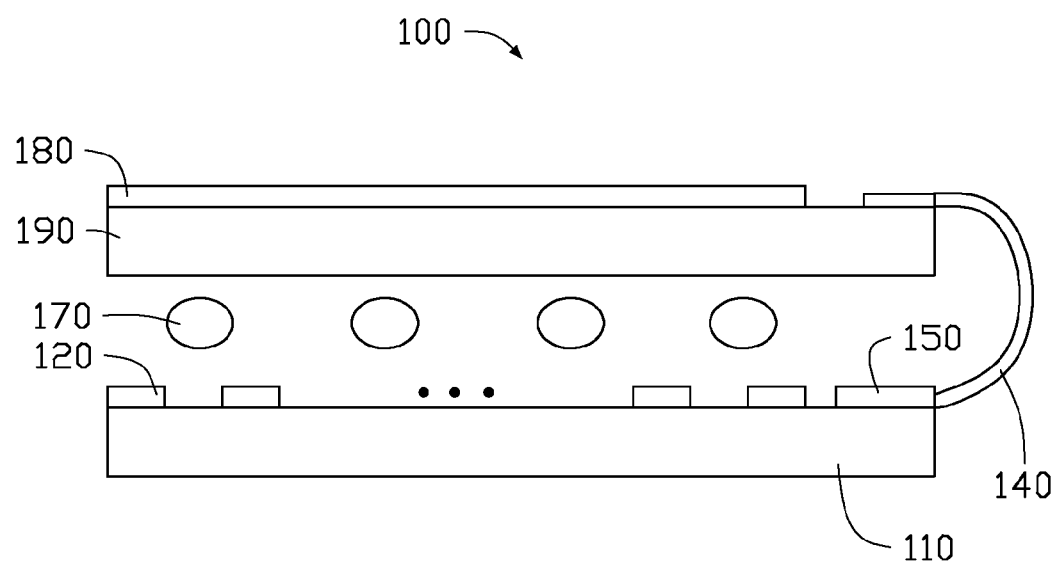
FIG. 1 is a diagrammatic view of a touch display device of a first embodiment.
Figure 2:
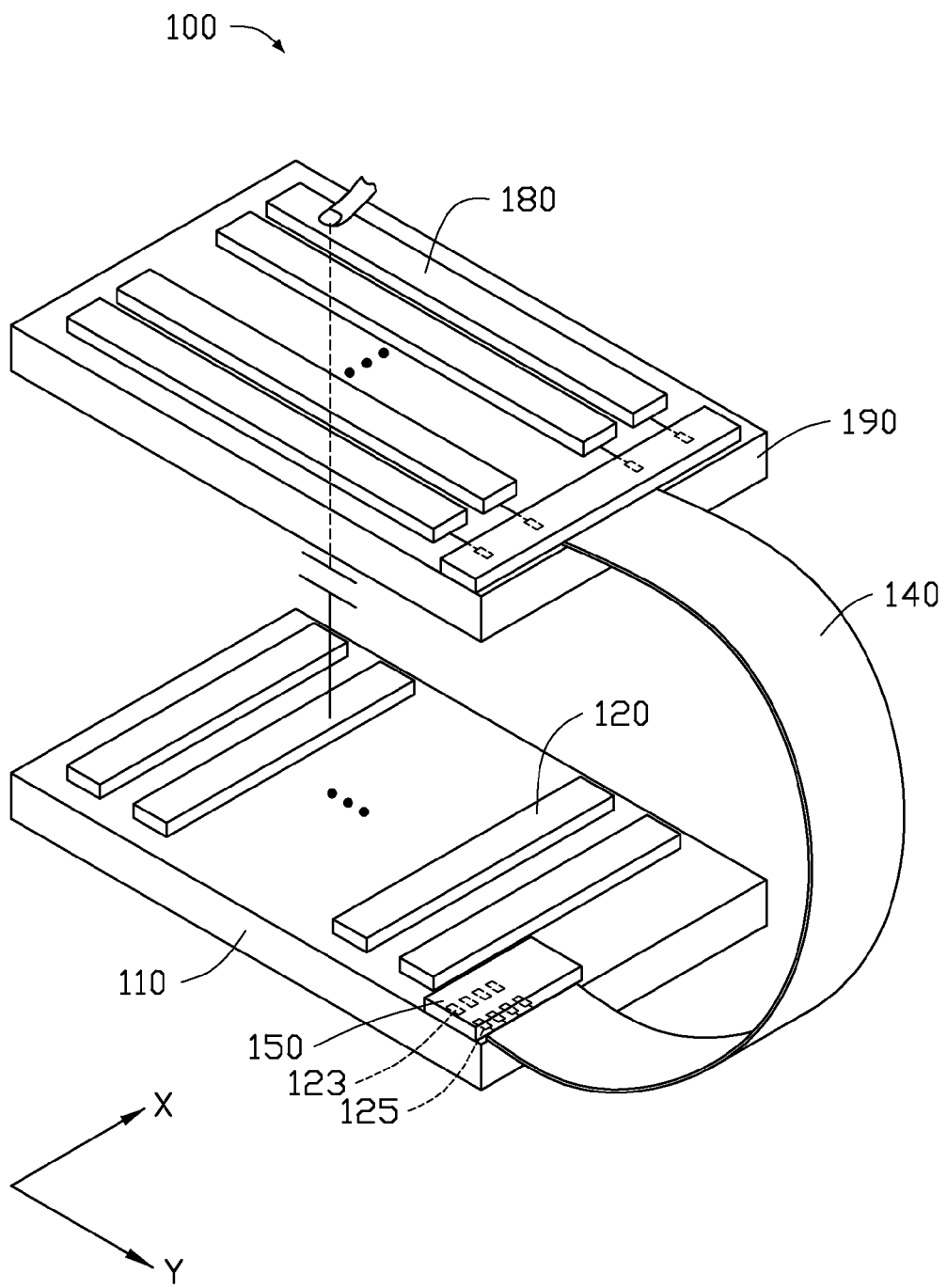
FIG. 2 is an isometric view of the touch display device of FIG. 1.
Figure 3:
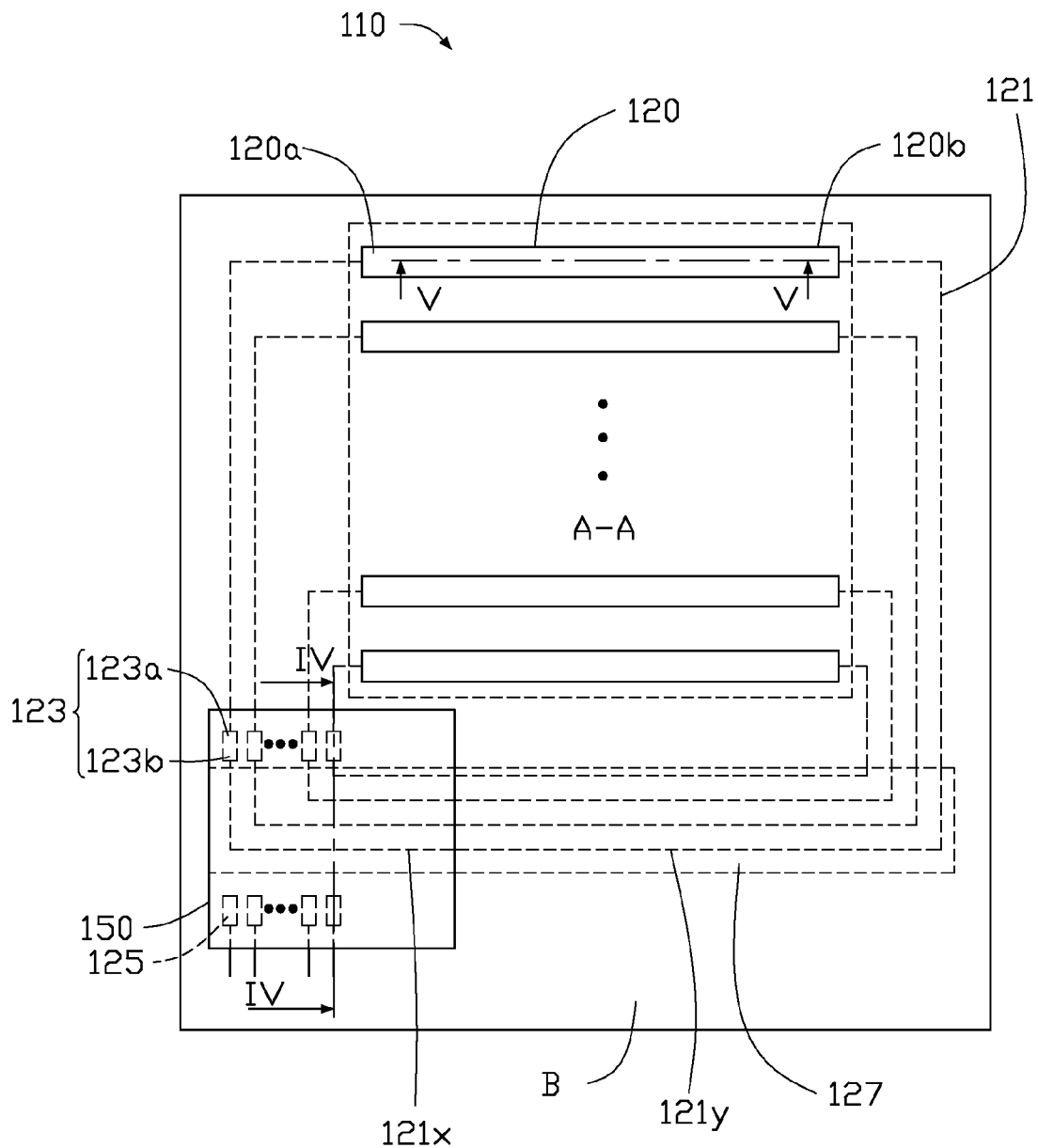
FIG. 3 is a diagrammatic view of a first substrate of the touch display device of FIG. 2.

FIGS. 1 and 2 illustrate a touch display device 100 of a first embodiment. FIG. 3 illustrates a wiring pattern of the first substrate. Referring to FIGS. 1 to 3, the touch display device 100 includes a first substrate 110, a second substrate 190, a liquid crystal layer 170, a number of first sensing electrodes 120, a number of second sensing electrodes 180, a touch IC 150, a number of connecting wires 121, and a connecting circuit 140. In this embodiment, the connecting circuit 140 is an FPC (flexible printed circuit). The liquid crystal layer 170 is disposed between the first substrate 110 and the second substrate 190. The touch display device 100 defines a display area A-A and a non-display area B encircling the display area A-A on the first substrate 110 and the second substrate 190. The first sensing electrodes 120 are formed on a surface of the first substrate 110 facing the liquid crystal layer 170 and located in the display area A-A. The second sensing electrodes 180 are formed on a surface of the second substrate 190 opposite to the liquid crystal layer 170 and located in the display area A-A. The touch IC 150 is set on the surface of the first substrate 110 facing the liquid crystal layer 170 and located in the non-display area B. The connecting circuit 140 connects the second sensing electrodes 180 with the touch IC 150. The connecting wires 121 are formed in the first substrate 110 and located in the non-display area B. The first sensing electrodes 120 are connected to the touch IC 150 via the connecting wires 121.

In this embodiment, the touch display device 100 is a fringe field switching (FFS) type touch display device 100 or an in-plane switching (IPS) type touch display device 100. The first sensing electrodes 120 are extended along a first direction X. The second sensing electrodes 180 are extended along a second direction Y. The first direction X is perpendicular to the second direction Y. The first sensing electrodes 120 cooperates with the second sensing electrodes 180 to generate a touch sensing signal corresponding to a touch in the display area A-A. The touch sensing signal is transmitted to the touch IC 150 to determine a position of the touch in the display area A-A.

Referring to FIG. 3, the touch IC 150 includes a number of first pins 123 and a number of second pins 125. The first pins 123 are arranged as a line and near the display area A-A. The second pins 125 are arranged far away from display area A-A. The second pins 125 are also arranged as line parallel to the line of the first pins 123. The first pins 123 correspondingly connects with the first sensing electrodes 123 via the connecting wires 121. The second pins 125 correspondingly connects with the second sensing electrodes 180 via the connecting circuit 140 (see FIG. 2). Each of the first sensing electrode 120 includes two opposite connecting terminals 120a and 120b. Each of the first pins 123 includes two opposite ends 123a and 123b. A pair of connecting wires 121 correspondingly connect two opposite terminals 120a and 120b of each first sensing electrodes 120 with two opposite ends 123a and 123b of one of the first pins 123 to form a closed loop path.

Figure 4:
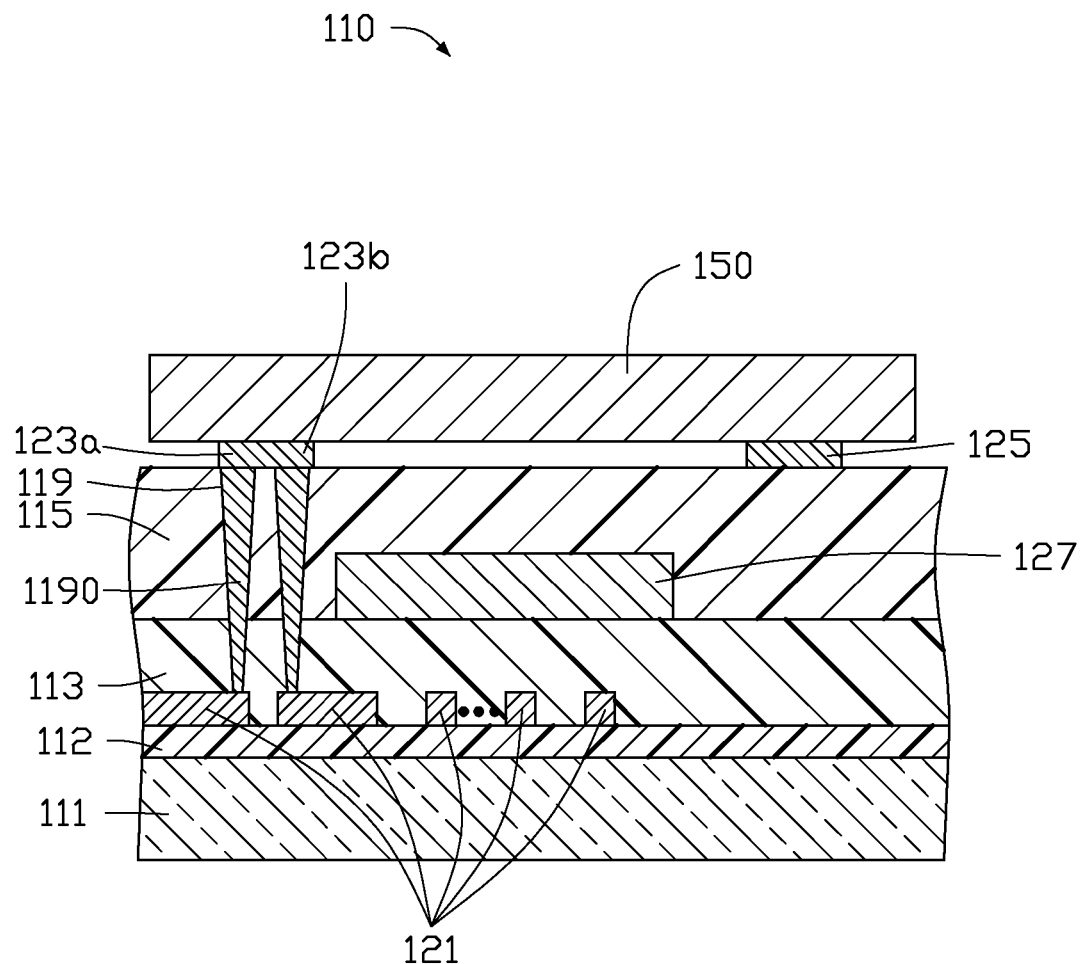
FIG. 4 is a cross-sectional view of the first substrate of FIG. 3, taken along line IV-IV.

FIG. 4 illustrates a cross-sectional view taken along line IV-IV of FIG. 3. Referring to FIG. 4, the first substrate 110 further includes a base 111, a first insulating layer 112, a second insulating layer 113, a shielding sheet 127, a third insulating layer 115, and a number of connecting lines 1190. The first insulating layer 112 is formed on the base 111. The second insulating layer 113 is formed on the first insulating layer 112 to cover the connecting wires 121. The shielding sheet 127 is formed on the second insulating layer 113 corresponding to at least a part of the connecting wires 121. In the embodiment, the shielding sheet 127 is located above a part of the connecting wires 121 which are arranged between the first pins 123 and the second pins 125. The shielding sheet 127 is made of conductive material. For example, in this embodiment, the shielding sheet 127 is made of conductive metal. In other embodiments, the shielding sheet 127 also can be made of indium tin oxide (ITO). The shielding sheet 127 is grounded or applied with a constant voltage to reduce a capacity coupling generated between the connecting wires 121 and the second pins 125. The third insulating layer 115 is formed on the second insulating layer 113 to cover the shielding sheet 127. Two opposite ends 123a and 123b of each first pin 123 are correspondingly aligned with the connecting wires 121. The first substrate 110 defines a number of connecting through holes 119 passing through the second insulating layer 113 and the third insulating layer 115. The connecting through holes 190 are corresponding to the two opposite ends 123a and 123b of each first pin 123. The connecting lines 1190 are formed in the connecting through holes 119 to connect the connecting wires 121 with the first pins 123.

Figure 5:
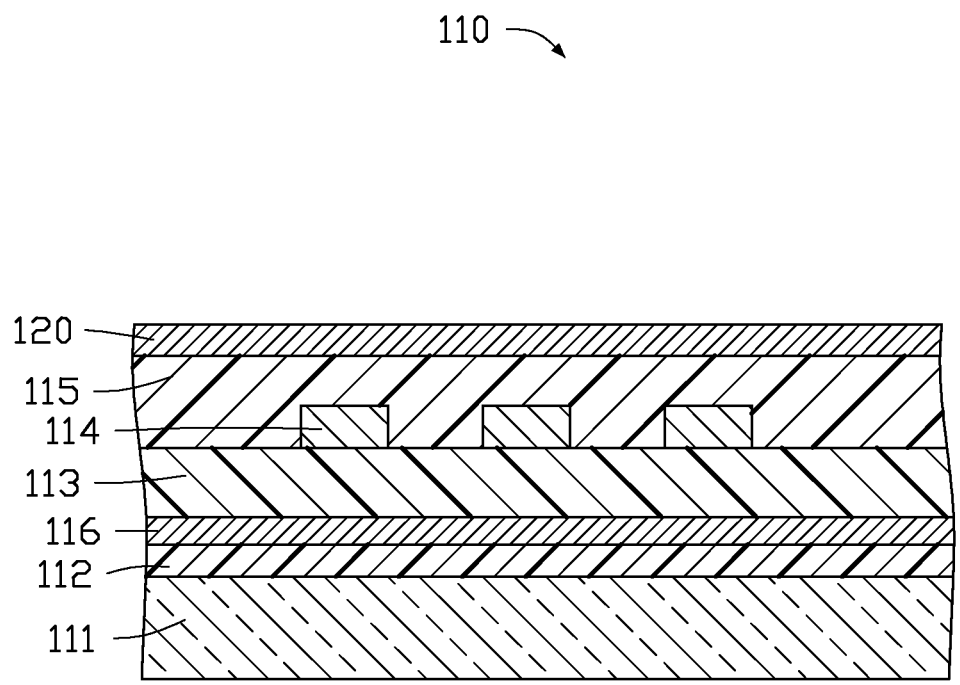
FIG. 5 is a cross-sectional view of the first substrate of FIG. 3, taken along line V-V.

FIG. 5 illustrates a cross-sectional view taken along line V-V of FIG. 3. Referring to FIG. 5, the first substrate 110 further includes a number of gate lines 116 and a number of data lines 114. The gate lines 116 and the data lines 114 are located in the display area A-A. The gate lines 116 are formed on the first insulating layer 112. The gate lines 116 are extended along a direction parallel to the first sensing electrodes 120. The data lines 114 are formed on the second insulating layer 113. The data lines 114 are extended along a direction perpendicular to the first sensing electrodes 120. In this embodiment, the gate lines 116 are formed at the same time with the connecting wires 121 by patterning a first conductive metal. The data lines 114 are formed at the same time with the shielding sheet 127 by patterning a second conductive metal.

Figure 6:
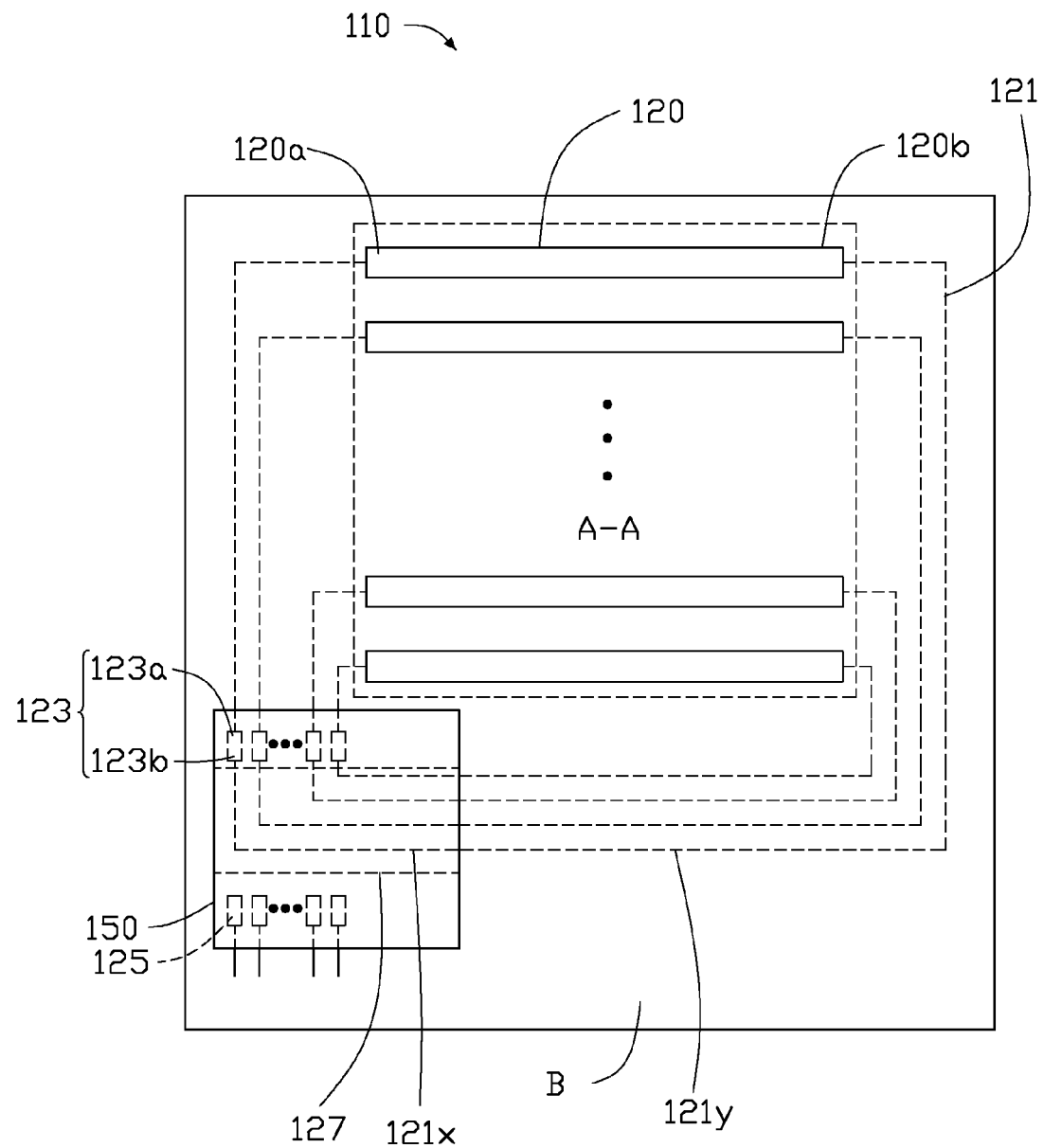
FIG. 6 is a diagrammatic view of a first substrate of a touch display device of a second embodiment.

Referring to FIG. 3, the part of the connecting wires 121 arranged between the first pins 123 and the second pins 125 includes a first portion 121x located in a projection of the touch IC 150 and a second portion 121y located out of a projection of the touch IC 150. In this embodiment, the shielding sheet 127 covers both of the first portion 121x and the second portion 121y. Referring to FIG. 6, in a second embodiment, the shielding sheet 127 only covers the first portion 121x.

It is believed that the present embodiments and their advantages will be understood from the foregoing description, and it will be apparent that various changes may be made thereto without departing from the scope of the disclosure or sacrificing all of its material advantages, the examples hereinbefore described merely being preferred or exemplary embodiments.

What is claimed is:

1. A touch display device comprising:
a first substrate;
a second substrate;
a plurality of first sensing electrodes formed on the first substrate;
a plurality of second sensing electrodes formed on the second substrate;
a touch integrated circuit set on the first substrate comprising a plurality of first pins correspondingly connected to the first sensing electrodes and a plurality of second pins correspondingly connected to the second sensing electrodes; and
a plurality of connecting wires formed on the first substrate and configured to correspondingly connect two opposite terminals of the first sensing electrodes with two opposite ends of the first pins, wherein a pair of connecting wires correspondingly connect two opposite terminals of each first sensing electrode to two opposite ends of one of the first pins to form a closed loop path;
wherein at least some of the connecting wires are arranged between the first pins and the second pins, the first substrate comprises a shielding sheet formed in the first substrate, and the shielding sheet is located above the part of the connecting wires arranged between the first pins and the second pins, thereby reducing any capacity coupling generated between the connecting wires and the second pins.

2. The touch display device of claim 1, wherein the part of the connecting wires arranged between the first pins and the second pins comprises a first portion located in a projection of the touch integrated circuit and a second portion located out of a projection of the touch integrated circuit.

3. The touch display device of claim 2, wherein the shielding sheet covers both of the first portion and the second portion.

4. The touch display device of claim 2, wherein the shielding sheet covers the first portion.

5. The touch display device of claim 1, wherein the shielding sheet is made of conductive material.

6. The touch display device of claim 5, wherein the shielding sheet is made of indium tin oxide.

7. The touch display device of claim 5, wherein the shielding sheet is made of conductive metal.

8. The touch display device of claim 1, wherein the shielding sheet is grounded.

9. The touch display device of claim 1, wherein the shielding sheet is applied with a constant voltage.

10. The touch display device of claim 1, further comprising a connecting circuit, wherein the connecting circuit correspondingly connects the second sensing electrodes with the second pins of the touch integrated circuit.

11. The touch display device of claim 1, the connecting circuit is a flexible printed circuit.

12. The touch display device of claim 1, wherein the touch display device defines a display area and a non-display area encircling the display area.

13. The touch display device of claim 12, wherein the first sensing electrodes and the second sensing electrodes are located in the display area, and the touch integrated circuit and the connecting wires are located in the non-display area.

14. The touch display device of claim 1, wherein the first substrate comprises a base, a first insulating layer, a second insulating layer, and a third insulating layer, the first insulating layer is formed on the base, the connecting wires are formed on the first insulating layer, the second insulating layer is formed on the first insulating layer to cover the connecting wires, the shielding sheet is formed on the second insulating layer, and the third insulating layer is formed on the second insulating layer to cover the shielding sheet.

15. The touch display device of claim 14, wherein the touch integrated circuit is connected on the third insulating layer, two ends of each first pin are correspondingly aligned with the connecting wires, the first substrate defines a plurality of connecting through holes passing through the second insulating layer and the third insulating layer, the connecting through holes are corresponding to the two ends of each first pins, the first substrate further comprises a plurality of connecting lines formed in each of the connecting through holes, and the connecting lines connect the connecting wires with the first pins.

16. The touch display device of claim 14, wherein the first substrate further comprises a plurality of gate lines formed on the first insulating layer and a plurality of data lines formed on the second insulating layer, the gate lines and the data lines are located in the display area, the gate lines are formed at the same time with the connecting wires by patterning a first conductive metal, and the data lines are formed at the same time with the shielding sheet by patterning a second conductive metal.

* * * * *